United States Patent
Lin et al.

(10) Patent No.: US 10,736,150 B2
(45) Date of Patent: Aug. 4, 2020

(54) APPARATUS AND METHOD FOR TRANSMITTING SIGNALS OVER A PHYSICAL RANDOM ACCESS CHANNEL

(71) Applicant: Telefonaktiebolaget LM Ericsson (publ), Stockholm (SE)

(72) Inventors: Xingqin Lin, Santa Clara, CA (US); Margaretha Forsgren, Sollentuna (SE); Fredrik Huss, Sundbyberg (SE); Olof Liberg, Stockholm (SE); Yi-Pin Eric Wang, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 92 days.

(21) Appl. No.: 16/079,468

(22) PCT Filed: May 2, 2018

(86) PCT No.: PCT/SE2018/050445
§ 371 (c)(1),
(2) Date: Aug. 23, 2018

(87) PCT Pub. No.: WO2018/203807
PCT Pub. Date: Nov. 8, 2018

(65) Prior Publication Data
US 2020/0037364 A1 Jan. 30, 2020

Related U.S. Application Data

(60) Provisional application No. 62/502,075, filed on May 5, 2017.

(51) Int. Cl.
*H04W 74/08* (2009.01)
*H04L 25/03* (2006.01)
*H04L 27/26* (2006.01)

(52) U.S. Cl.
CPC ... *H04W 74/0833* (2013.01); *H04L 25/03866* (2013.01); *H04L 27/2605* (2013.01)

(58) Field of Classification Search
CPC ......... H04W 74/0833; H04L 25/03866; H04L 27/2605
See application file for complete search history.

(56) References Cited

U.S. PATENT DOCUMENTS

2009/0041240 A1* 2/2009 Parkvall ............ H04W 72/0413
380/247
2018/0279363 A1* 9/2018 Su ...................... H04W 74/0833

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.5.0, Mar. 2017, 1-171.
(Continued)

*Primary Examiner* — Thai Nguyen
(74) *Attorney, Agent, or Firm* — Murphy, Bilak & Homiller, PLLC

(57) ABSTRACT

A method of transmitting a signal over a physical random access channel, wherein the signal comprises a plurality of symbols forming a symbol group. The method comprises applying scrambling to a plurality of symbols within the symbol group.

17 Claims, 15 Drawing Sheets

(56) References Cited

OTHER PUBLICATIONS

3GPP , "3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, Mar. 2017, 1-194.

Unknown, Author , "Discussion on NPRACH enhancement", Samsung, 3GPP TSG RAN WG1 Meeting #88bis, R1-1705311, Spokane, USA, Apr. 3-7, 2017, 1-3.

Unknown, Author , "NB-IoT—NPRACH Sequences", Ericsson, Discussion and decision, 3GPP TSG RAN WG1 NB-IoT Ad-Hoc Meeting, R1-161834, Sophia Antipolis, France, Mar. 22-24, 2016, 1-6.

Unknown, Author , "NB-IoT—Single Tone Frequency NB-PRACH Design", Ericsson, 3GPP TSG-RAN1 #84, R1-160275, St Julian's, Malta, Feb. 15-19, 2016, 1-10.

Unknown, Author , "NPRACH enhancement in NB-IoT", LG Electronics, 3GPP TSG RAN WG1 Meeting #88bis, R1-1704850, Spokane, USA, Apr. 3-7, 2017, 1-3.

Unknown, Author , "NPRACH false alarm reduction for NB-IoT", Ericsson, 3GPP TSG-RAN WG1 #89, R1-1706891, Hangzhou, China, May 15-19, 2017, 1-7.

Unknown, Author , "NPRACH range enhancements for NB-IoT", Ericsson, 3GPP TSG-RAN WG1 #88bis, R1-1705186, Spokane, USA, Apr. 3-7, 2017, 1-4.

Unknown, Author , "NPRACH support for large cell access", Qualcomm Incorporated, 3GPP TSG-RAN WG1 #88-bis, R1-1705020, Spokane, US, Apr. 3-7, 2017, 1-3.

* cited by examiner

APPARATUS AND METHOD FOR TRANSMITTING SIGNALS OVER A PHYSICAL RANDOM ACCESS CHANNEL

TECHNICAL FIELD

The embodiments described herein relate to apparatus and methods for transmitting signals over a physical random access channel, for example transmitting a preamble signal over a narrow-band Internet of Things Physical Random Access Channel, NPRACH.

BACKGROUND

In Release 13, the Third Generation Partnership Project, 3GPP, developed a concept known as Narrow-Band Internet of Things, NB-IoT. This new radio access technology is dedicated to provide connectivity to services and applications demanding qualities such as reliable indoor coverage and high capacity in combination with low device complexity and power consumption.

In Release 14, 3GPP expanded the NB-IoT platform to provide positioning services, as well as support for multicast, and device output power as low as 14 dBm to cater for even lower device complexity. Also, incremental improvements such as support for system access on non-anchor carriers and improved uplink (UL) and downlink (DL) throughput are specified.

Despite the fact that NB-IoT supports indoor coverage in the most extreme scenarios through support for a high maximum coupling loss, the feature has not been designed to support more than 40 km cell radius. In Release 15 it is now proposed to introduce extended cell range for NB-IoT, for example to facilitate usage also in rural areas without any limitations.

In NB-IoT it is the random access procedure (RA) that provides the means of synchronization to the uplink frame structure. A device (e.g. UE) initiates the RA procedure after synchronizing to the downlink frame structure. In a first step of the RA process a device transmits a preamble. In a second step the eNB detects the preamble time of arrival (TA) and signals the TA value to the UE. The UE will thereafter use the TA value to align its transmission to the UL frame structure.

Referring to FIG. 1, for NB-IoT a random access preamble corresponds to a random access symbol group that is constructed of 5 identical symbols and a cyclic prefix (see Technical Specification, TS 36.211, section 10.1.6). Each symbol corresponds to an unmodulated sinus wave of frequency 3.75 kHz and periodicity 8192 Ts=266 µs, where Ts equals $1/(15000 \times 2048)$ seconds. The preamble is transmitted over a 3.75 kHz channel. Two cyclic prefix (CP) lengths are supported, i.e. 66 µs (Format 0) and 266 µs (Format 1). For the 266 µs choice the CP is identical to a symbol.

FIG. 1 illustrates a random access symbol group of length 1.4 ms or 1.6 ms.

The NB-IoT minimum system bandwidth of 180 kHz is dividable by 48 sub-carriers, or tones. For a single NB-IoT physical random access channel (NPRACH) transmission the symbol group of FIG. 1 is hopping four times across at most seven sub-carriers, as shown in FIG. 2 below. This physical signal, also called a preamble, is uniquely defined by the first sub-carrier in the hopping pattern, i.e. the starting sub-carrier. Therefore, in total 48 orthogonal preambles can be defined, one for each available starting sub-carrier.

FIG. 2 illustrates a random access frequency hopping symbol group, illustrating an example configuration where a symbol group is 1.6 ms long.

FIG. 2 illustrates a NPRACH resource intended for UEs in good radio conditions, where the random access frequency hopping symbol group is sent a single time. An eNB may configure two additional NPRACH resources to be used by UEs in extended and extreme coverage. Each NPRACH resource is associated with a set of repetitions of the random access frequency hopping symbol group. The number of repetitions is increasing with the coverage intended to be supported by the NPRACH resource. A UE can measure, for example, the downlink received power and makes, based on this, and for example a set of broadcasted signal level thresholds, a selection of the NPRACH resource to use for its system access, i.e. the number of times the random access frequency hopping symbol group should be repeated.

FIG. 3 provides an Illustration of a typical NPRACH configuration with three resources for Coverage Enhancements level 0 (CE0), 1 (CE1) and 2 (CE2).

In this example at most 128 repetitions of the above depicted random access frequency hopping symbol group is supported. In case of repetitions, a pseudo random frequency hop is performed between two frequency hopping symbol groups. In this example, the signal generated over a set of repetitions will at most hop across 12 sub-carriers.

The NPRACH configuration information discussed herein may be transmitted, for example, in the RadioResourceConfigCommonSIB-NB-r13 information element (IE), that is contained in SystemInformationBlockType2-NB (SIB2-NB).

As noted above, the current NPRACH preamble basic waveform is a sinusoid of 3.75 kHz with periodicity 266 µs. This means that, a UE located 40 km from an eNB will have a round trip time of $2 \times 40000/c = 266$ µs, i.e. corresponding to the NPRACH preamble periodicity. Here "c" equals the speed of light, i.e. $3 \times 10^8$ m/s.

This implies that an eNB receiver which e.g. detects a received preamble and its TA based on a correlation between a known reference waveform and the received waveform, will have difficulties to distinguish a preamble received from a UE at a distance of 40.000+x meters from the eNB and from a UE at a distance x meters from the eNB. This ambiguity is a consequence of defining the preamble as a periodic waveform. Although proprietary solutions can be developed to resolve the ambiguity, solutions with explicit standards support will likely be introduced in Rel-15 for NB-IoT.

There is, however, another issue related to false alarm, which occurs if the post-processing statistic of a potential NPRACH preamble exceeds some predetermined threshold when the NPRACH preamble is not present. With a false alarm, the consequence is that the eNB would respond a vain message (MSG2) that corresponds to the non-existent NPRACH preamble. There are several tools for avoiding false detection events in NB-IoT. But there is also room for improvement especially in the case of highly loaded and/or asynchronous networks where NPRACH interference from devices in neighboring cells may trigger false alarms. This is mainly due to that the Random access frequency hopping symbol group definition (see FIG. 2) is the same in all cells. So if a strong interfering NPRACH appears at the eNB receiver it may be mistaken for a valid NPRACH, and trigger a false alarm.

SUMMARY

It is an aim of the embodiments described herein to provide a method and apparatus which obviate or reduce at least one or more of the disadvantages mentioned above.

According to a first aspect there is provided a method of transmitting a signal over a physical random access channel, wherein the signal comprises a plurality of symbols forming a symbol group. The method comprises applying scrambling to a plurality of symbols within the symbol group.

The scrambling may be performed, for example, such that a first scrambling symbol is applied to at least first and second adjacent symbols within the symbol group. A second scrambling symbol may be applied to at least third and fourth adjacent symbols within the symbol group.

According to another aspect there is provided a user equipment for transmitting a signal over a physical random access channel. The user equipment comprises a processor and a memory, said memory containing instructions executable by said processor. The user equipment is operative to apply scrambling to a plurality of symbols within the symbol group.

According to another aspect, there is provided a method in a network node. The method comprises receiving a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group. The method comprises descrambling predetermined symbols of the symbols forming the symbol group.

According to another aspect, there is provided a network node comprising a processor and a memory, said memory containing instructions executable by said processor. The network node is operative to receive a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group. The network node is operative to descramble predetermined symbols of the symbols forming the symbol group.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
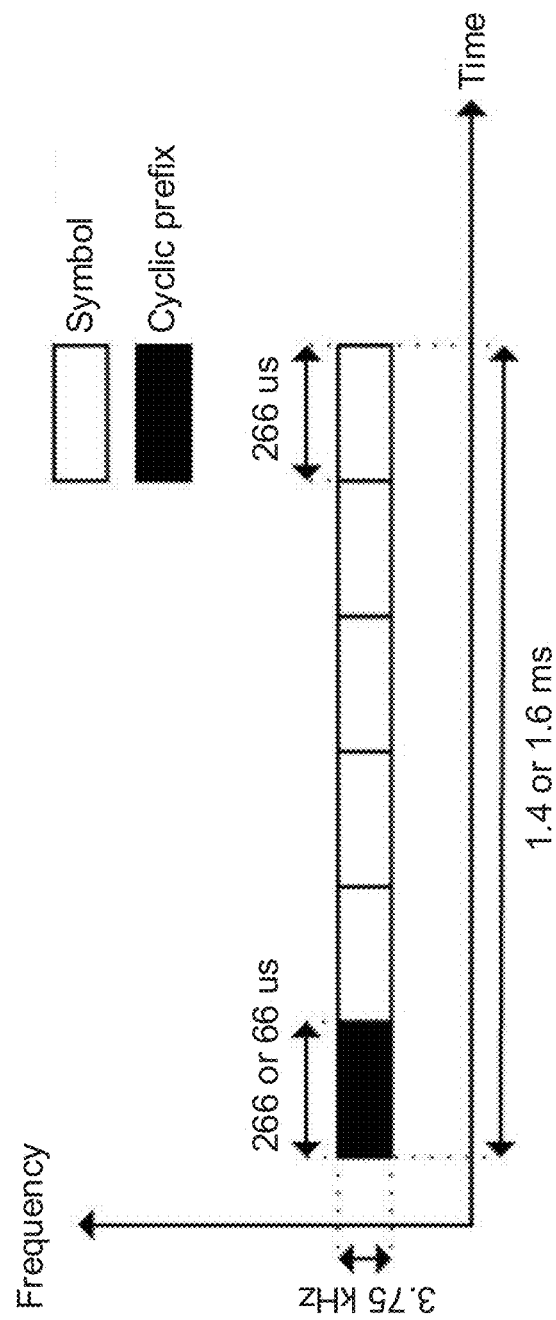
FIG. 1 shows an example of a random access symbol group of length 1.4 ms or 1.6 ms.
Figure 2:
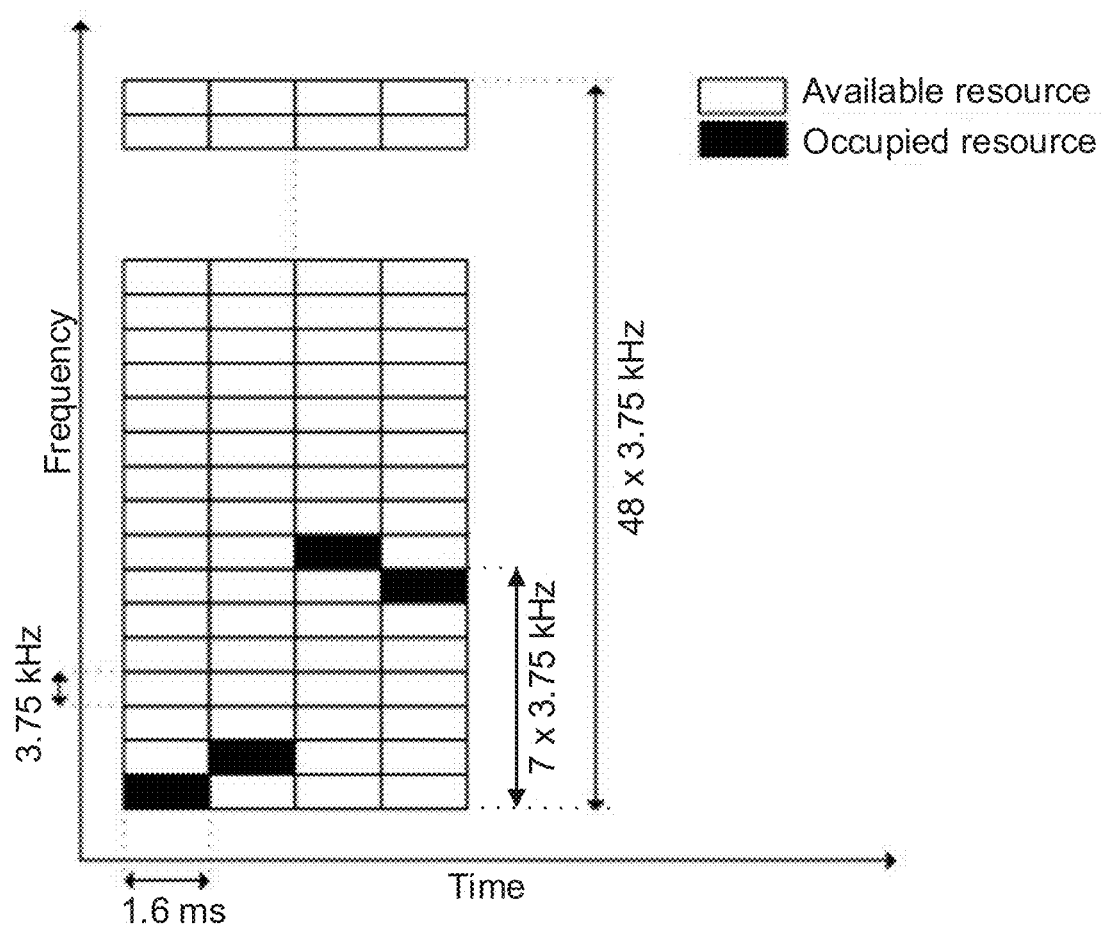
FIG. 2 illustrates an example of a random access frequency hopping symbol group, illustrating an example configuration where a symbol group is 1.6 ms long.
Figure 3:
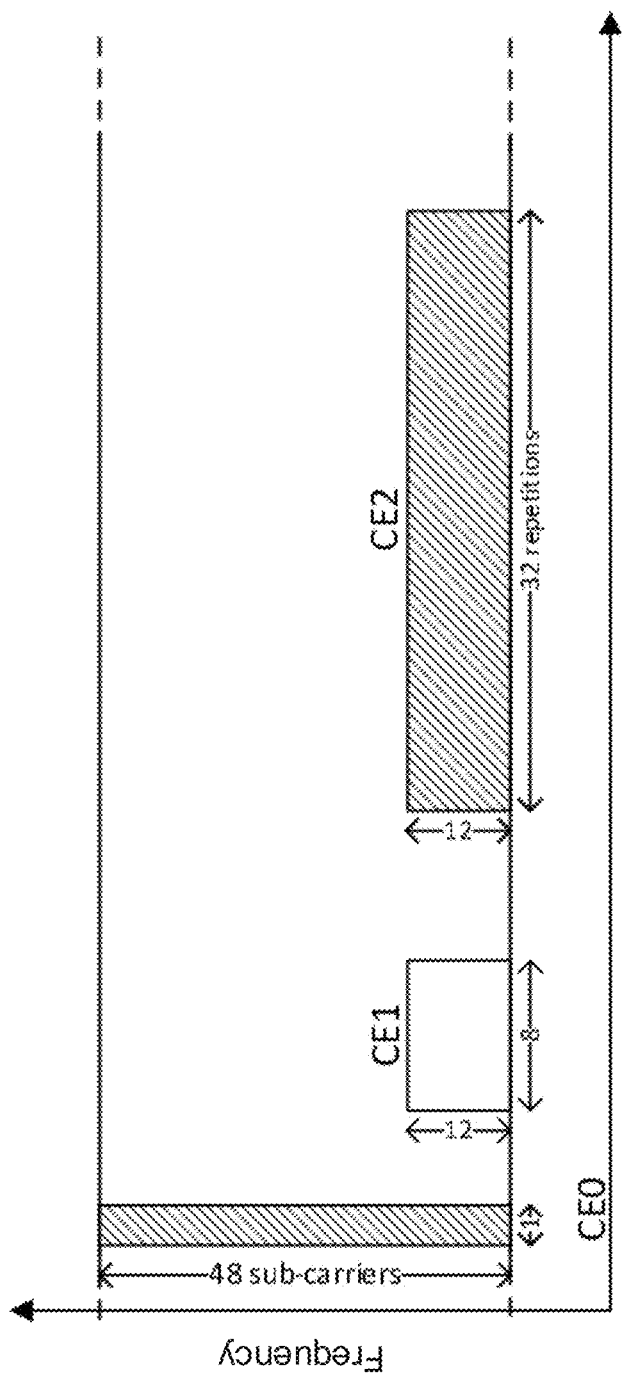
FIG. 3 illustrates an example of a NPRACH configuration with three resources for Coverage Enhancements level 0 (CE0), 1 (CE1) and 2 (CE2)

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile device, communication device, IoT device, MM device, wireless communication device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the general terms "terminal device", "communication device" and "wireless communication device" are used in the following description, and it will be appreciated that such a device may or may not be 'mobile' in the sense that it is carried by a user. Instead, the term "terminal device" (and the alternative general terms set out above) encompasses any device that is capable of communicating with communication networks that operate according to one or more mobile communication standards, such as the Global System for Mobile communications, GSM, UMTS, Long-Term Evolution, LTE, 5G, New Radio etc. A UE may comprise a Universal Subscription Identity Module (USIM) on a smart-card or implemented directly in the UE, e.g., as software or as an integrated circuit. The operations described herein may be partly or fully implemented in the USIM or outside of the USIM.

Examples described herein propose to scramble the transmission of signals over a physical random access channel, for example a NPRACH transmission, for example by new cell dependent sequences.

Scrambling NPRACH, for example Rel-13 NPRACH, by new cell dependent sequences has the potential of addressing both reliability (i.e. false alarm) and range enhancements, while maintaining a high degree of backward compatibility. However, if the scrambling is not done appropriately, there may be disadvantages such as (1) that scrambling may make FFT processing impossible at the receiver, and (2) the orthogonality of preamble transmissions on different subcarriers may be lost, which might be a new source of false alarm. These issues are described below.

Figure 4:
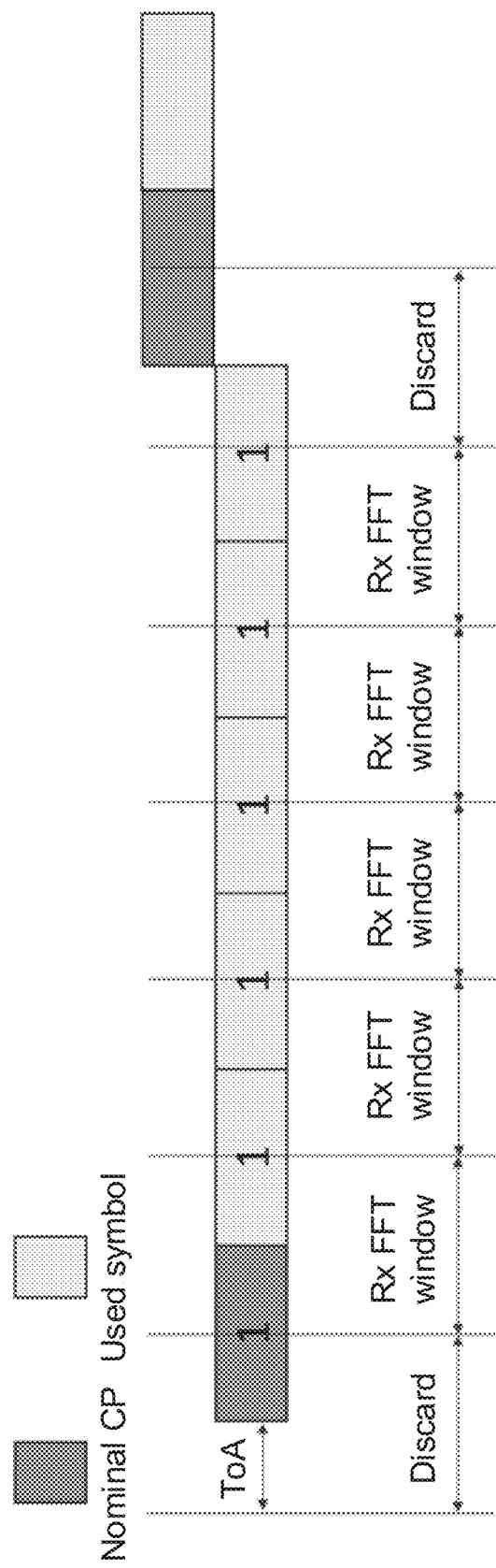
FIG. 4 illustrates an example of a Rel-13 NPRACH symbol group and receiver FFT processing.

FIG. 4 illustrates an example of a Rel-13 NPRACH symbol group and receiver FFT processing.

As illustrated in FIG. 4, a Rel-13 NPRACH symbol group consists of a cyclic prefix, CP, and 5 repetitive OFDM symbols. In this example, every symbol takes a constant value "1". The samples into FFT at the eNB for the first symbol can come from the CP portion and the first portion of the 1st symbol. The samples into FFT for the second symbol can come from the last portion of the 1st symbol (which effectively acts as CP) and the first portion of the 2nd symbol, etc. After FFT processing, the receiver can correctly obtain a sequence of symbols in the frequency domain. Then time-of-arrival (ToA) can be estimated by processing the phases of the sequence of symbols.

If Rel-13 NPRACH is scrambled arbitrarily, for example on a per symbol basis, the receiver FFT processing may become impossible and the ToA cannot be estimated by processing the phases of the sequence of symbols in frequency domain.

Figure 5:
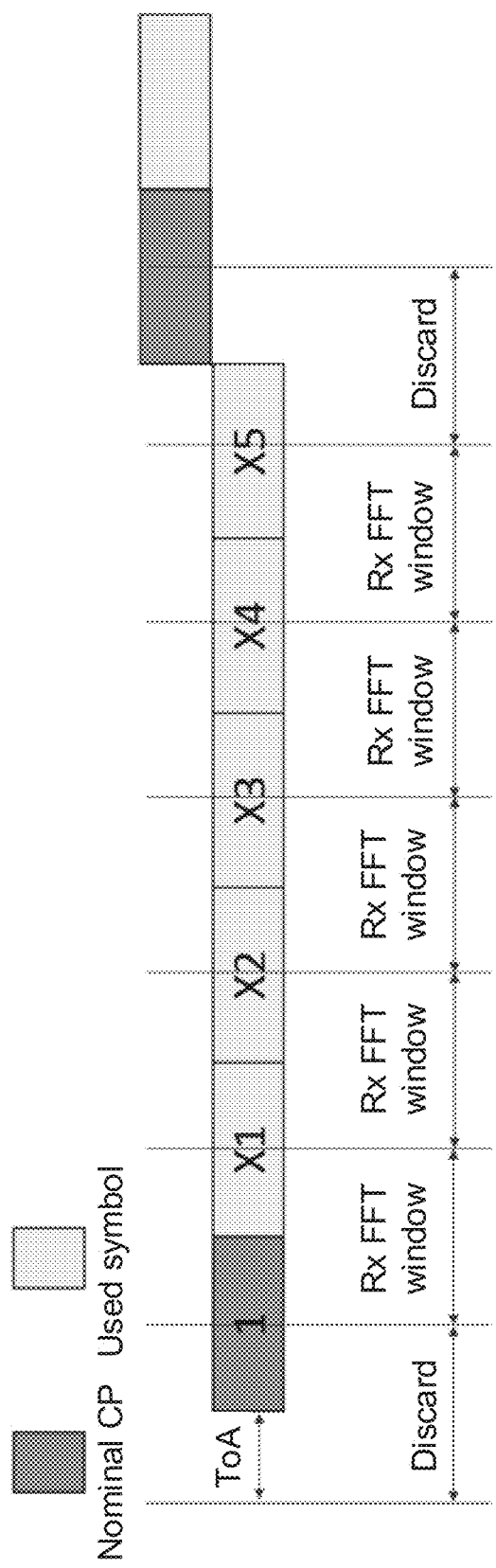
FIG. 5 illustrates an example where Rel-13 NPRACH symbol group is scrambled arbitrarily.

This is illustrated in FIG. 5, which illustrates an example where Rel-13 NPRACH symbol group is scrambled arbitrarily. In FIG. 5 the complex symbols X1, X2, X3, X4, X5 are not necessarily the same. Then, the signal inputs to the receiver FFT processing will contain discontinuities in phase and amplitude. For example, the samples into FFT for the second symbol can come from the last portion of the 1st symbol, X1 (which cannot act as CP), and the first portion of the 2nd symbol, X2. Due to this, after FFT processing, the eNB cannot correctly obtain a sequence of symbols in the frequency domain. Accordingly, the ToA cannot be estimated by processing the phases of the sequence of symbols.

Another issue may be a loss of orthogonality of preamble transmissions on different subcarriers if Rel-13 NPRACH is scrambled arbitrarily.

Figure 6:
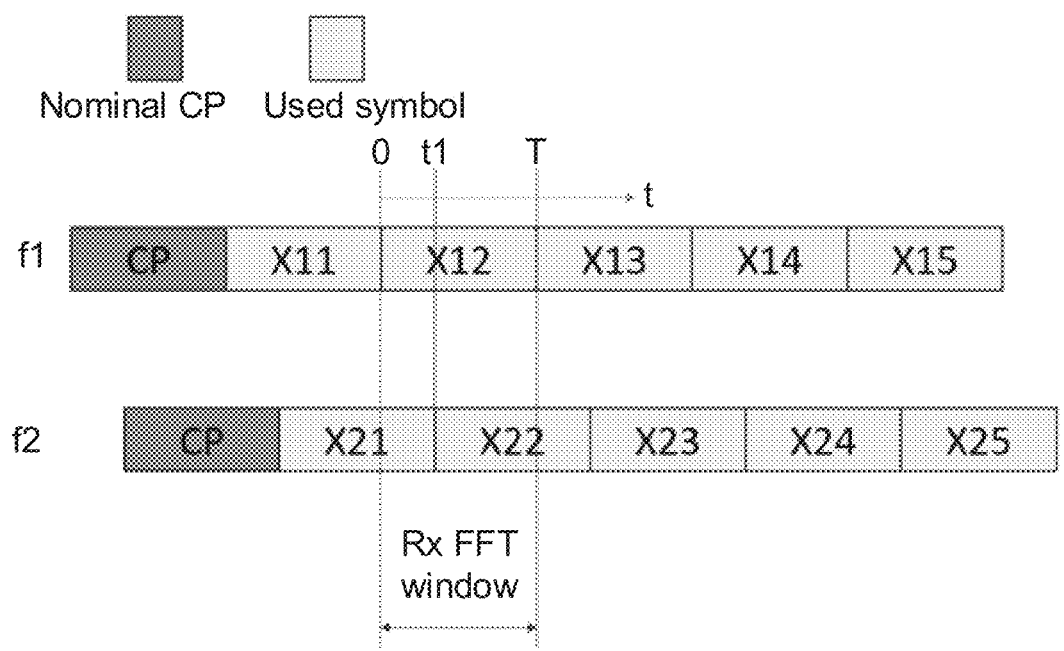
FIG. 6 illustrates an example of a loss of orthogonality if Rel-13 NPRACH symbol groups are scrambled arbitrarily, whereby the upper symbol group is transmitted on tone f1, and the lower symbol group on tone f2.

FIG. 6 illustrates such a loss of orthogonality if Rel-13 NPRACH symbol groups are scrambled arbitrarily, whereby the upper symbol group is transmitted on tone f1, and the lower symbol group on tone f2.

On tone f1, the scrambled symbols are (X11, X12, X13, X14, X15). On tone f2, the scrambled symbols are (X21, X22, X23, X24, X25). If the 2nd received symbols on tone f1 are taken, for example, an energy contribution from the symbols modulated on tone f2 will appear on and interfere with tone f1:

$$ICI=(f_2 \rightarrow f_1)=\int_0^{t_1} X_{21} e^{j2\pi f_2 t_e - j2\pi f_1 t} dt + \int_{t_1}^{T} X_{22} e^{j2\pi f_2 t_e - j2\pi f_1 t} dt \neq 0$$

Thus, according to examples described herein, there are provided scrambling schemes that support extended cell range for NB-IoT, and which can help reduce false alarm. The examples may also maintain the feasibility of FFT processing at the receiver and the orthogonality of preambles on different tones. The scrambling schemes according to the examples described herein may also maintain a high degree of backward compatibility.

In other words, the examples have an advantage of supporting an extended cell range, and can reduce false alarm of NPRACH for NB-IoT, while maintaining the feasibility of FFT processing at the receiver, the orthogonality of preambles on different tones, and a high degree of backward compatibility.

Figure 7A:
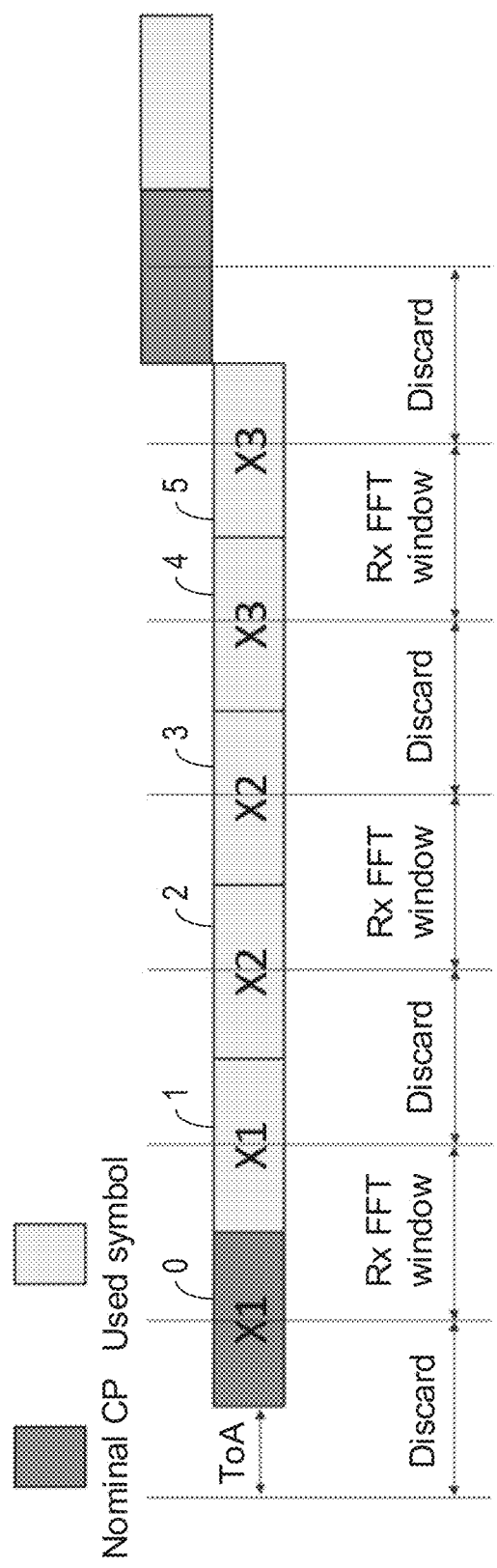
FIG. 7a shows an example of a first scrambling option according to an embodiment.

FIG. 7a shows an example of a first scrambling option according to an embodiment. For ease of discussion, the nominal cyclic prefix, CP, is called a symbol as well, with the symbols in a group labelled as 0, 1, 2, 3, 4, 5. In FIG. 7a, the same scrambling symbol is applied to every two adjacent symbols. In such an example symbol 0 can effectively act as CP for symbol 1, symbol 2 can effectively act as CP for symbol 3, and symbol 4 can effectively act as CP for symbol 5. Accordingly, the FFT operations can be applied to symbols 1, 3, 5. Then symbols 1, 3, 5 can be descrambled in the frequency domain, followed by processing of the phases of the symbols to obtain ToA estimate. Further, there is no inter subcarrier interference for symbols 1, 3, 5, and thus orthogonality is maintained for symbols 1, 3, 5.

This embodiment therefore applies a pairwise form of scrambling, for example wherein the scrambling is performed such that a first scrambling symbol is applied to at least first and second adjacent symbols within the symbol group, and wherein a second scrambling symbol is applied to at least third and fourth adjacent symbols within the symbol group.

Since the example of FIG. 7a illustrates a symbol group comprising six symbols, a first scrambling symbol is applied to a first pair of adjacent symbols; a second scrambling symbol is applied to a second pair of adjacent symbols; and a third scrambling symbol is applied to a third pair of adjacent symbols. It is noted that this option may also be applied to symbol groups having a different number of symbols therein.

This option supports the same CP length, e.g. 266 µs, as the existing Rel-13 NPRACH, but has the advantage that its scrambling breaks the symmetric structure of the existing waveform. This allows the eNB to support a cell range beyond what is intuitively supported by the CP by means of applying multiple hypothesis where each hypothesis is associated with a time shift of the FFT receive window by the CP length.

Figure 7B:
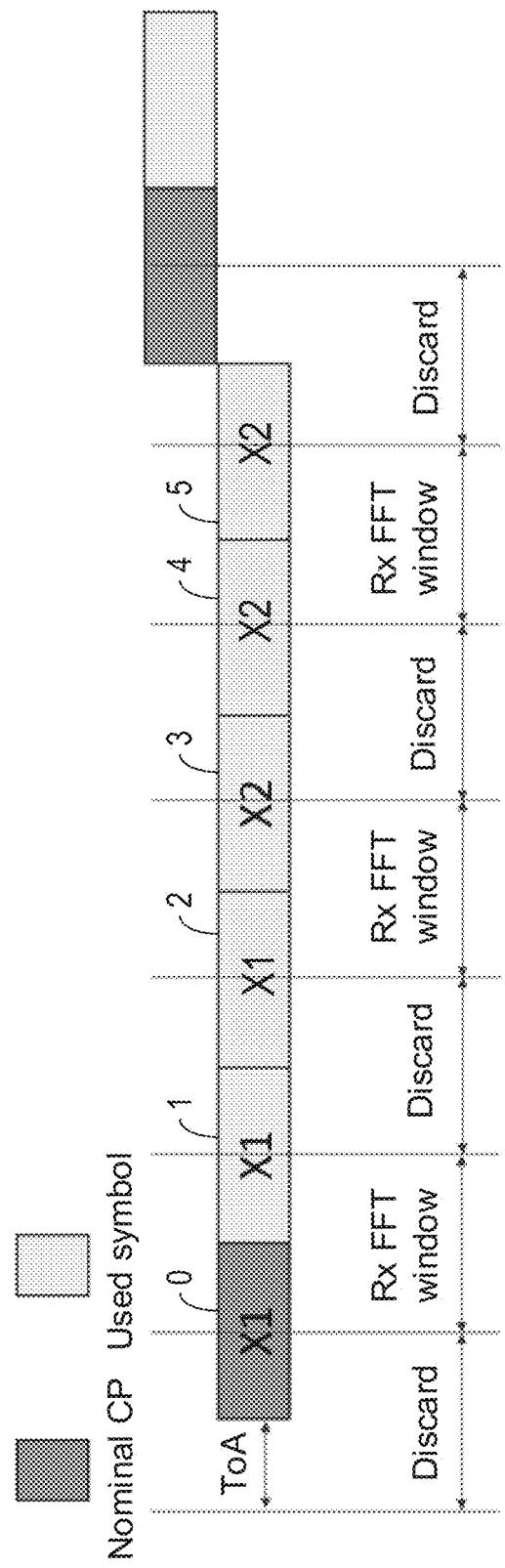
FIG. 7b shows an example of another scrambling option according to an embodiment.

FIG. 7b shows an example of another non-limiting embodiment. In FIG. 7b the same scrambling symbol is applied to every 3 adjacent symbols. Therefore, in this example, the scrambling symbol X1 is applied to the first three adjacent symbols 0, 1, 2 of the group of symbols, and the scrambling symbol X2 applied to the second three adjacent symbols 4, 5, 6 of the group of symbols.

Since the example of FIG. 7b illustrates a symbol group comprising six symbols, a first scrambling symbol is applied to a first set of three adjacent symbols, and a second scrambling symbol is applied to a second set of three adjacent symbols. As with other embodiments described herein, it is noted that this option may also be applied to symbol groups having a different number of symbols therein. For example, for a symbol group comprising eight symbols, a first scrambling symbol may be applied to a first set of four adjacent symbols, and a second scrambling symbol applied to a second set of four adjacent symbols.

The examples of FIGS. 7a and 7b relate to scrambling being applied to symbols within a symbol group.

Figure 8:
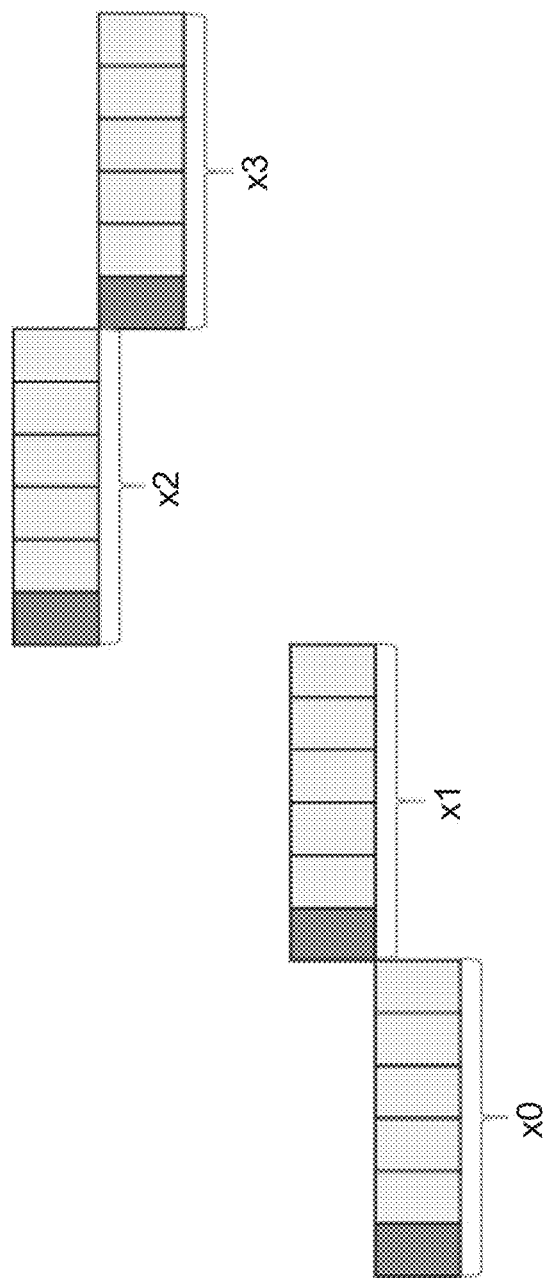
FIG. 8 shows an example of another scrambling option according to an embodiment.

FIG. 8 shows an example of another non-limiting embodiment, whereby the same scrambling symbol is applied to every adjacent symbol in the group of symbols, for example to each of the six adjacent symbols in the example of FIG. 8. In the example of FIG. 8 different scrambling symbols are applied to different scrambling groups. For example, a first scrambling symbol x0 is applied to a first scrambling group, while a second scrambling symbol x1 is applied to a second scrambling group. Other scrambling symbols x2, x3 are also shown as being applied to other symbol groups.

Therefore, in such an embodiment a first scrambling symbol is applied to symbols of a first symbol group, and a second scrambling symbol is applied to symbols of a second symbol group. The second symbol group may be adjacent to the first symbol group.

Figure 9:
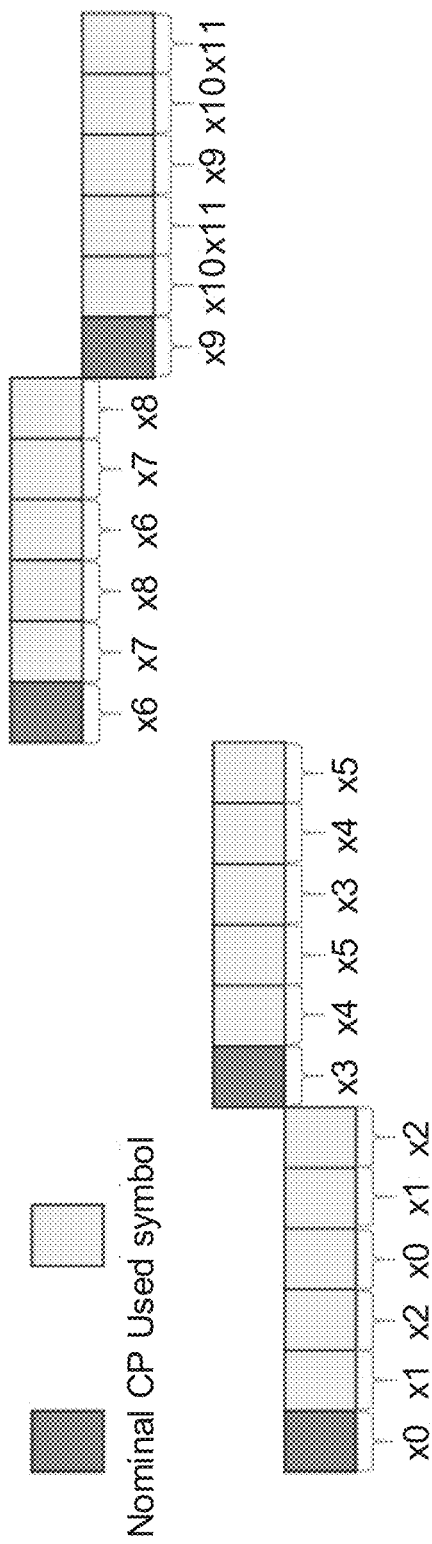
FIG. 9 shows an example of another scrambling option according to an embodiment.
Figure 10:
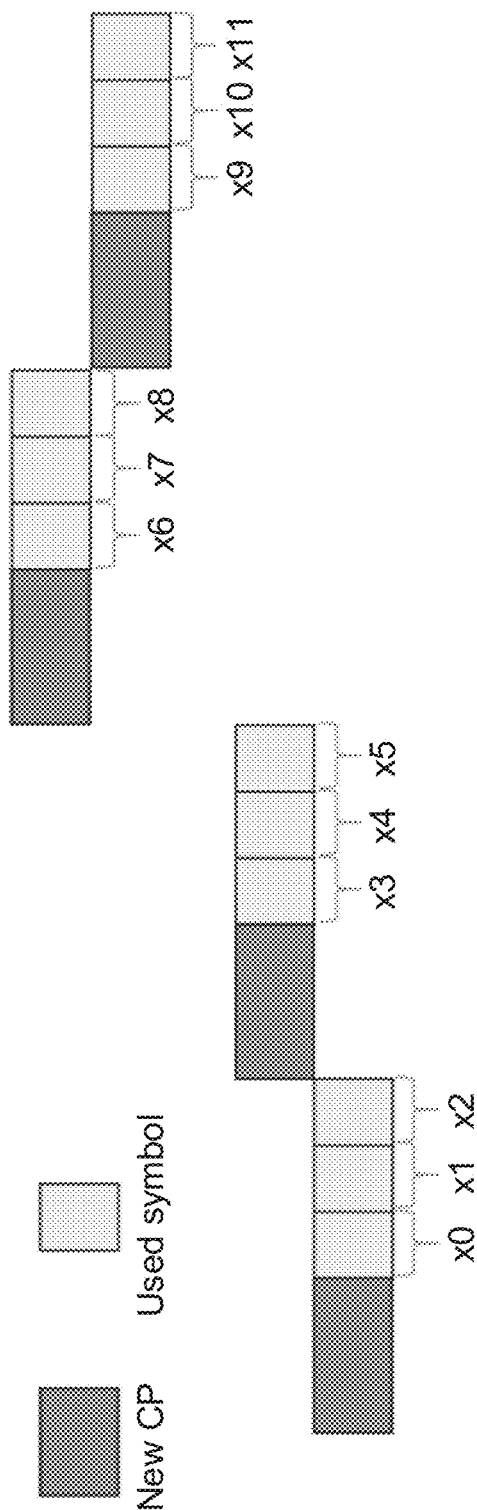
FIG. 10 relates to the example of FIG. 9.

FIG. 9 shows an example of another non-limiting embodiment, whereby the same scrambling symbol sequence is applied to a second part of a symbol group and repeated in a first part of the symbol group. For example, in FIG. 9 the same scrambling symbol sequence (i.e. the sequence x0, x1, x2) is applied to the last 3 adjacent symbols of the symbol group and then repeated in the first 3 symbols of the symbol group. If the first 3 symbols are shorter than the last 3 symbols, then the last part of the last 3 symbols are repeated in the first 3 symbols, as illustrated in FIG. 9. In other words, the first 3 symbols effectively act as cyclic prefix. This equivalent understanding is illustrated further in FIG. 10, which illustrates the new CP formed in this example.

Figure 11:
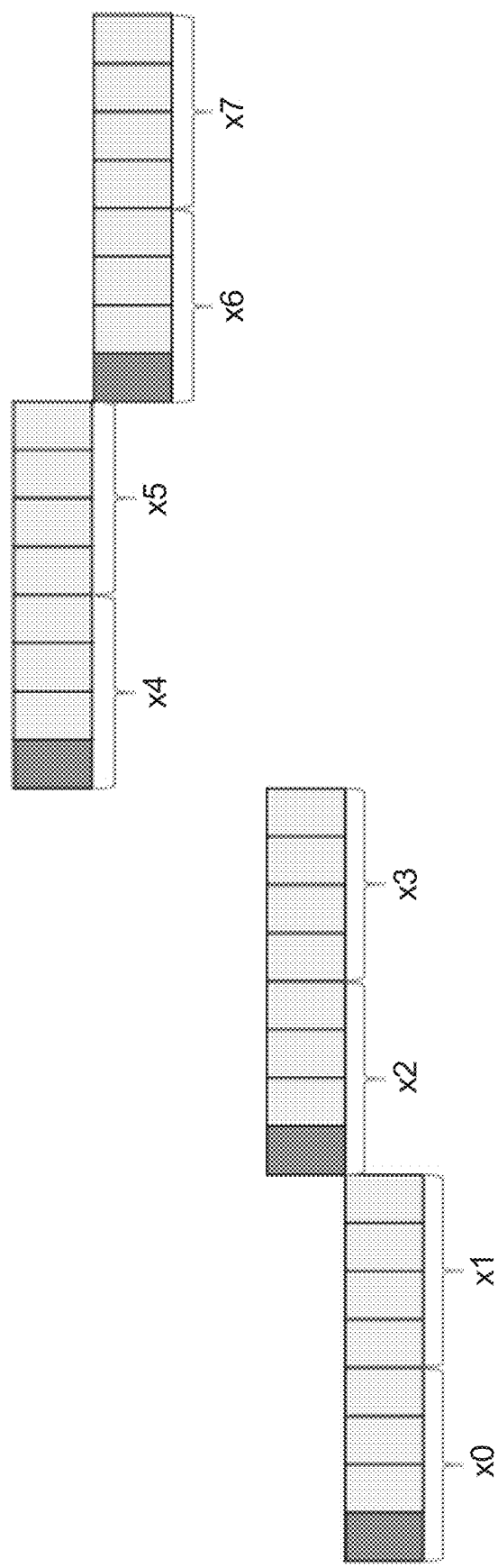
FIG. 11 shows an example of another scrambling option according to an embodiment.

Referring to FIG. 11, according to another example of a non-limiting embodiment, the number of symbols in a group can be increased, for example to 8, and the same scrambling symbol is applied to every 4 adjacent symbols. Thus, the example of FIG. 11 is similar to that of FIG. 7b, but whereby a symbol group comprises eight symbols rather than six.

It is noted that in the examples described herein a group of symbols may comprise any number of symbols, and a scrambling symbol may be applied to any number of adjacent symbols within a group of symbols.

According to another aspect, the scrambling symbols may be uniquely defined for each cell. This allows an eNB to reduce the false detection rate, and also identify interfering cells being the source of the false alarms. For example, the scrambling symbol can be generated from a function, such as, but not limited to, a pseudo-random sequence, and initialized with a cell identifier, such as, but not limited to, the Narrowband physical layer cell identity.

According to another aspect, the signalling for activating and deactivating the use of the NPRACH format described herein may be conveyed by means of broadcast signalling, or by means of dedicated signalling, for example using one or both of the narrow-band Broadcast Control Channel, NBCCH, or narrow-band Physical Downlink Control Channel, NPDCCH.

Figure 12A:
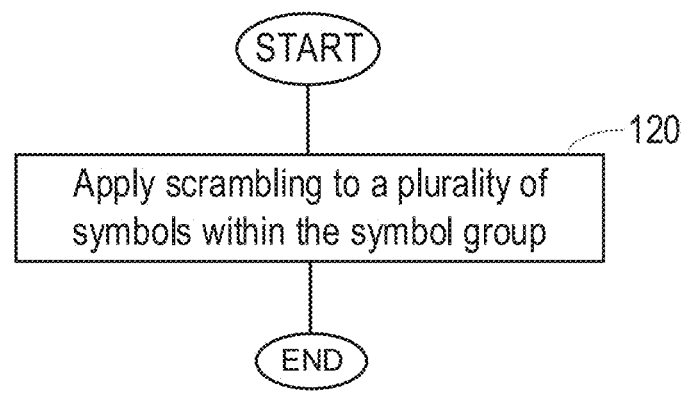
FIG. 12a shows an example of a method according to an embodiment.

FIG. 12a shows an example of a method according to an embodiment, for transmitting a signal over a physical random access channel, wherein the signal comprises a plurality of symbols forming a symbol group. The method comprises applying scrambling to a plurality of symbols within the symbol group, step 120. The method may be performed, for example, in a user equipment.

The physical random access channel may comprise a narrow-band Internet of Things physical random access channel, NPRACH. In such an example, the signal being transmitted may comprise a NPRACH preamble signal.

In one example the scrambling is performed on a per symbol basis, such that a different scrambling symbol is applied to each symbol within the symbol group.

As will be seen from the various embodiments described below, applying a different scrambling symbol to each symbol within a symbol group may include, for example, applying different scrambling symbols to scramble different symbols within the same symbol group, applying different scrambling symbols to scramble various symbols within the same symbol group, applying different scrambling symbols to scramble different symbols within different symbol groups, or applying different scrambling symbols to scramble symbols within different symbol groups, for example different symbol groups forming a set of symbol groups.

Figure 12B:
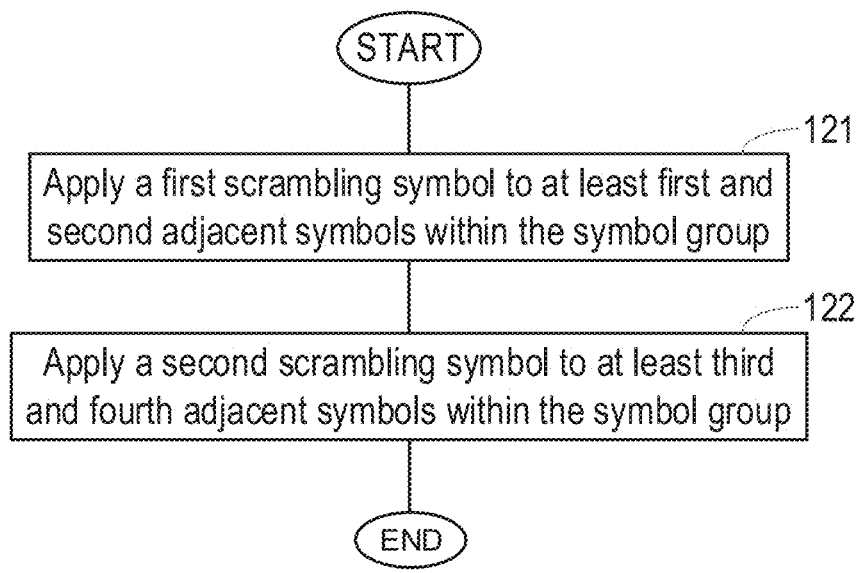
FIG. 12b shows an example of a method according to another embodiment.

FIG. 12b shows an example of a method according to another embodiment, for transmitting a signal over a physical random access channel, wherein the signal comprises a plurality of symbols forming a symbol group, and wherein scrambling is applied to a plurality of symbols within the symbol group. The method comprises applying a first scrambling symbol to at least first and second adjacent symbols within the symbol group, step 121. The method comprises applying a second scrambling symbol to at least third and fourth adjacent symbols within the symbol group, step 122.

In an example where the symbol group comprises six symbols, a first scrambling symbol may be applied to a first pair of adjacent symbols, a second scrambling symbol may be applied to a second pair of adjacent symbols, and a third scrambling symbol may be applied to a third pair of adjacent symbols.

In another example where the symbol group comprises six symbols, a first scrambling symbol may be applied to a first set of three adjacent symbols, and a second scrambling symbol may be applied to a second set of three adjacent symbols.

In another example, the symbol group comprises eight symbols, and wherein a first scrambling symbol is applied to a first set of four adjacent symbols, and a second scrambling symbol is applied to a second set of four adjacent symbols.

The first symbol of the group of symbols may comprise a cyclic prefix, CP, symbol. In other examples, a set of first symbols may comprise a cyclic, CP symbol.

In some examples, a first symbol of a sub-group of adjacent symbols having the same scrambling symbol may comprise a cyclic prefix, CP, symbol.

The group of symbols may comprise a random access symbol group.

The group of symbols may comprise a random access frequency hopping symbol group.

In some examples a definition of a random access frequency hopping symbol group is different in at least two cells of a communication network.

In some examples the scrambling may be based on cell dependent sequences.

In some examples the scrambling symbols are uniquely defined for each cell in a communication network.

The method of FIG. 12 or 12b may further comprise receiving a control signal for activating and/or deactivating the scrambling of symbols within the symbol group. For example, the control signal may be received from a broadcast signal, or from a dedicated signal received in one or both of a narrow-band Broadcast Control Channel, NBCCH, or narrow-band Physical Downlink Control Channel, NPDCCH.

In some examples a symbol group is 1.4 ms or 1.6 ms long.

Figure 13:
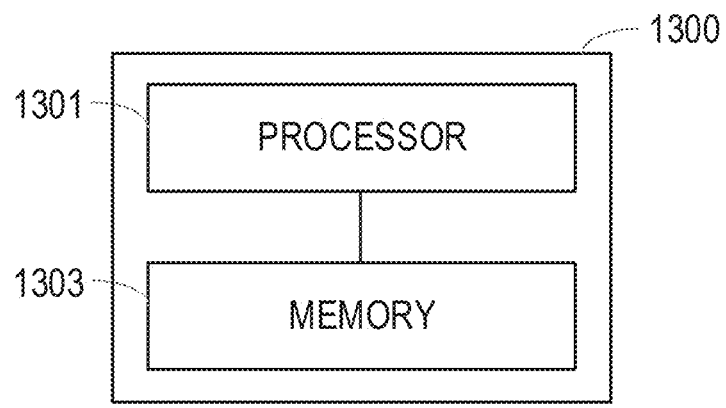
FIG. 13 shows an example of a user equipment according to an embodiment.

FIG. 13 shows an example of a user equipment 1300 according to another embodiment, for transmitting a signal over a physical random access channel. The signal may comprise, for example, a plurality of symbols forming a symbol group. The user equipment comprising a processor 1301 and a memory 1303, said memory 1303 containing instructions executable by said processor 1301. The user equipment is operative to apply scrambling to a plurality of symbols within the symbol group.

In one example, the user equipment is operative to apply a first scrambling symbol to at least first and second adjacent symbols within the symbol group, and apply a second scrambling symbol to at least third and fourth adjacent symbols within the symbol group.

The user equipment may be further operative to perform the method as described in any of the examples above.

According to another aspect, there is provided a method in a network node, for example an eNB. The method comprises receiving a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group. The method comprises descrambling predetermined symbols of the symbols forming the symbol group.

The predetermined symbols may be descrambled in a frequency domain, and the method may further comprise processing of the phases of the descrambled symbols to determine a time of arrival, ToA, value.

The method may comprise transmitting the determined ToA value to a user equipment from which the signal comprising the group of symbols was received.

Figure 14:
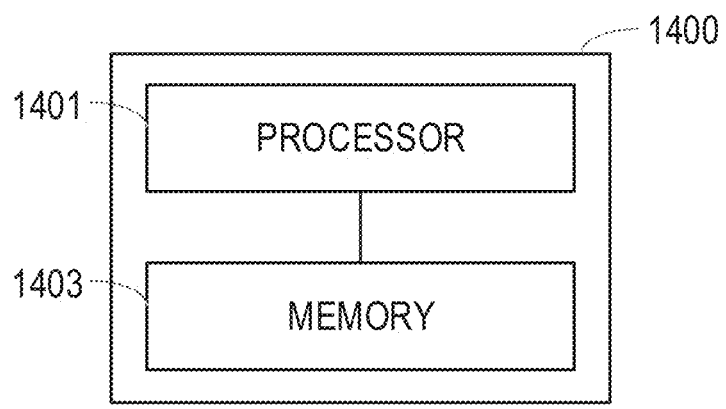
FIG. 14 shows an example of a network node according to an embodiment.

FIG. 14 shows an example of a network node 1400 according to an embodiment, for example an eNB. The network node 1400 comprises a processor 1401 and a memory 1403, said memory 1403 containing instructions executable by said processor 1401. The network node 1400 is operative to: receive a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group; and descramble predetermined symbols of the symbols forming the symbol group.

The network node 1400 may be further operative to perform the method as described above.

Figure 15:
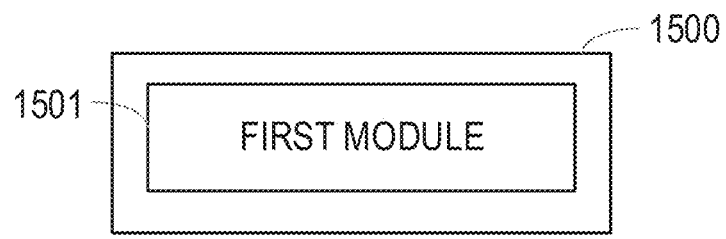
FIG. 15 shows an example of a user equipment according to an embodiment.

FIG. 15 shows an example of a user equipment 1500 according to another embodiment, for transmitting a signal over a physical random access channel. The signal may comprise, for example, a plurality of symbols forming a symbol group. The user equipment comprises a first module 1501 configured to apply scrambling to a plurality of symbols within the symbol group. The first module 1501 may be configured to apply scrambling according to any of the methods described above.

Figure 16:
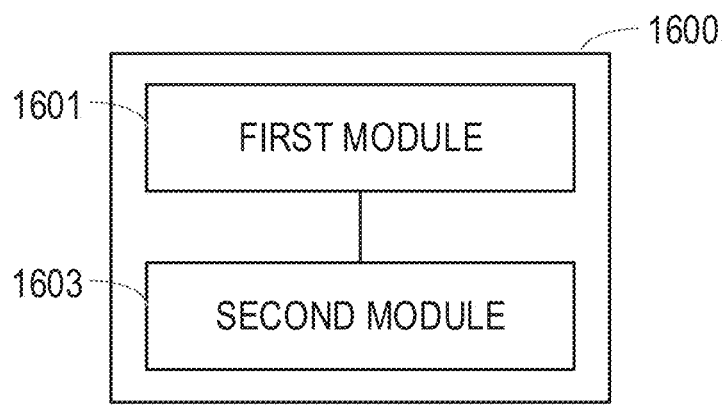
FIG. 16 shows an example of a user equipment according to an embodiment.

FIG. 16 shows an example of a user equipment 1600 according to another embodiment, for transmitting a signal over a physical random access channel. The signal may comprise, for example, a plurality of symbols forming a symbol group. The user equipment comprises a first module 1601 configured to apply a first scrambling symbol to at least first and second adjacent symbols within the symbol group. The user equipment comprises a second module 1603 configured to apply a second scrambling symbol to at least third and fourth adjacent symbols within the symbol group.

It is noted that, while embodiments mentioned herein have been described as having certain symbol sizes within a symbol group, it is noted that a symbol group may comprise any number of symbols.

Furthermore, in addition to having different scrambling symbols used to scramble different symbols within the same symbol group, different scrambling symbols may also be used to scramble different symbols within different symbol groups, for example different symbol groups forming a set of symbol groups, such as a set of symbol groups forming part of a hopping sequence.

The examples described herein define scrambling sequences for NPRACH that can help reduce false alarm and provide explicit standards support for large cells, for example of radius greater than 40 km.

For the avoidance of doubt, the examples described herein comprise embodiments as defined by the following statements.

Statement 1. A method of transmitting a signal over a physical random access channel, wherein the signal comprises a plurality of symbols forming a symbol group, wherein the method comprises applying scrambling to a plurality of symbols within the symbol group.

Statement 2. A method as in statement 1, wherein scrambling is performed on a per symbol basis, such that a different scrambling symbol is applied to each symbol within the symbol group.

Statement 3. A method as in statement 1, wherein the scrambling is performed such that a first scrambling symbol is applied to at least first and second adjacent symbols within the symbol group.

Statement 4. A method as in statement 3, wherein a second scrambling symbol is applied to at least third and fourth adjacent symbols within the symbol group.

Statement 5. A method as in statement 1, wherein the symbol group comprises six symbols, and wherein:
   a first scrambling symbol is applied to a first pair of adjacent symbols;

a second scrambling symbol is applied to a second pair of adjacent symbols; and a third scrambling symbol is applied to a third pair of adjacent symbols.

Statement 6. A method as in statement 1, wherein the symbol group comprises six symbols, and wherein:

a first scrambling symbol is applied to a first set of three adjacent symbols; and a second scrambling symbol is applied to a second set of three adjacent symbols.

Statement 7. A method as in statement 1, wherein the symbol group comprises eight symbols, and wherein:

a first scrambling symbol is applied to a first set of four adjacent symbols; and a second scrambling symbol is applied to a second set of four adjacent symbols.

Statement 8. A method as in any one of statements 1 to 7, wherein:

a first symbol of the group of symbols comprises a cyclic prefix, CP, symbol; or a set of first symbols of the group of symbols comprises a cyclic, CP symbol.

Statement 9. A method as in any one of statements 3 to 7, wherein a first symbol of a sub-group of adjacent symbols having the same scrambling symbol comprises a cyclic prefix, CP, symbol.

Statement 10. A method as in any one of statements 1 to 9, wherein the group of symbols comprises a random access symbol group.

Statement 11. A method as in any one of statements 1 to 10, wherein the group of symbols comprises a random access frequency hopping symbol group.

Statement 12. A method as in statement 11, wherein a definition of a random access frequency hopping symbol group is different in at least two cells of a communication network.

Statement 13. A method as in any one of statements 1 to 12, wherein scrambling is based on cell dependent sequences.

Statement 14. A method as in any one of statements 1 to 12, wherein scrambling symbols are uniquely defined for each cell in a communication network.

Statement 15. A method as in any one of statements 1 to 14, further comprising receiving a control signal for activating and/or deactivating the scrambling of symbols within the symbol group.

Statement 16. A method as in statement 15, wherein the control signal is received from a broadcast signal, or from a dedicated signal received in one or both of a narrow-band Broadcast Control Channel, NBCCH or narrow-band Physical Downlink Control Channel, NPDCCH.

Statement 17. A method as in any one of statements 1 to 16, wherein a symbol group is 1.4 ms or 1.6 ms long.

Statement 18. A method as in any one of statements 1 to 17, wherein the physical random access channel comprises a narrow-band Internet of Things physical random access channel, NPRACH.

Statement 19. A method as in any one of statements 1 to 7, wherein the signal comprises a NPRACH preamble signal.

Statement 20. A user equipment (1300) for transmitting a signal over a physical random access channel, the user equipment comprising a processor (1301) and a memory (1303), said memory (1303) containing instructions executable by said processor (1301), whereby said user equipment is operative to:

apply scrambling to a plurality of symbols within the symbol group.

Statement 21. A user equipment as in statement 20, wherein the user equipment is further operative to perform the method of any one of statements 2 to 19.

Statement 22. A method in a network node, the method comprising:

receiving a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group; and descrambling predetermined symbols of the symbols forming the symbol group.

Statement 23. A method as in statement 22, wherein the predetermined symbols are descrambled in a frequency domain, and wherein the method further comprises processing of the phases of the descrambled symbols to determine a time of arrival, ToA, value.

Statement 24. A method as in statement 22, comprising transmitting the determined ToA value to a user equipment from which the signal comprising the group of symbols was received.

Statement 25. A network node (1400) comprising a processor (1401) and a memory (1403), said memory (1403) containing instructions executable by said processor (1401), whereby said network node is operative to:

receive a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group; and descramble predetermined symbols of the symbols forming the symbol group.

Statement 26. A network node (1400) as in statement 25, wherein the network node is further operative to perform the method of statements 24 or 25.

It should be noted that the above-mentioned embodiments illustrate rather than limit the invention, and that those skilled in the art will be able to design many alternative embodiments without departing from the scope of the embodiments described above. The word "comprising" does not exclude the presence of elements or steps other than those listed in a claim, "a" or "an" does not exclude a plurality, and a single processor or other unit may fulfil the functions of several units recited in the statements. Any reference signs in the statements shall not be construed so as to limit their scope.

The invention claimed is:

1. A method, wherein the method comprises:
applying scrambling to a plurality of symbols within a symbol group comprising at least first and second adjacent symbols and at least third and fourth adjacent symbols, wherein applying scrambling to the plurality of symbols within the symbol group includes applying a first scrambling symbol to at least the first and second adjacent symbols within the symbol group and applying a second scrambling symbol to at least the third and fourth adjacent symbols within the symbol group; and
transmitting, over a physical random access channel, a signal comprising the symbol group with the scrambled symbols.

2. The method of claim 1, wherein the symbol group comprises six symbols, and wherein:
the first scrambling symbol is applied to a first pair of adjacent symbols, wherein the first pair of adjacent symbols includes the first and second adjacent symbols within the symbol group;
the second scrambling symbol is applied to a second pair of adjacent symbols, wherein the second pair of adjacent symbols includes the third and fourth adjacent symbols within the symbol group; and
a third scrambling symbol is applied to a third pair of adjacent symbols.

3. The method of claim 1, wherein the symbol group comprises six symbols, and wherein:
a first scrambling symbol is applied to a first set of three adjacent symbols, wherein the first set of three adjacent symbols includes the first and second adjacent symbols within the symbol group; and
a second scrambling symbol is applied to a second set of three adjacent symbols, wherein the second set of three adjacent symbols includes the third and fourth adjacent symbols within the symbol group.

4. The method of claim 1, wherein the symbol group comprises eight symbols, and wherein:
a first scrambling symbol is applied to a first set of four adjacent symbols, wherein the first set of four adjacent symbols includes the first and second adjacent symbols within the symbol group; and
a second scrambling symbol is applied to a second set of four adjacent symbols, wherein the second set of four adjacent symbols includes the third and fourth adjacent symbols within the symbol group.

5. The method of claim 1, wherein:
the first scrambling symbol is applied to symbols of a first symbol sub-group within the symbol group, wherein first symbol sub-group includes the at least first and second adjacent symbols within the symbol group; and
the second scrambling symbol is applied to symbols of a second symbol sub-group within the symbol group, wherein second symbol sub-group includes the at least third and fourth adjacent symbols within the symbol group.

6. The method of claim 1, wherein:
a first symbol of the group of symbols comprises a cyclic prefix, CP, symbol; or
a set of first symbols of the group of symbols comprises a cyclic, CP symbol.

7. The method of claim 1, wherein a first symbol, of a sub-group of adjacent symbols within the symbol group having the same scrambling symbol, comprises a cyclic prefix, CP, symbol.

8. The method of claim 1, wherein:
the group of symbols comprises a random access symbol group; or
the group of symbols comprises a random access frequency hopping symbol group.

9. The method of claim 1, wherein at least one of:
scrambling is based on cell dependent sequences; and
scrambling symbols are uniquely defined for each cell in a communication network.

10. The method of claim 1, further comprising at least one of:
receiving a control signal for activating; and
deactivating the scrambling of symbols within the symbol group.

11. The method of claim 1, wherein at least one of:
the physical random access channel comprises a narrowband Internet of Things physical random access channel (NPRACH); and
the signal comprises a NPRACH preamble signal.

12. A user equipment, the user equipment comprising:
a processor; and
a memory, said memory containing instructions executable by said processor,
wherein said user equipment is configured to apply scrambling to a plurality of symbols within a symbol group comprising at least first and second adjacent symbols and at least third and fourth adjacent symbols,
wherein applying scrambling to the plurality of symbols within the symbol group includes said user equipment configured to apply a first scrambling symbol to at least the first and second adjacent symbols within the symbol group and to apply a second scrambling symbol to at least the third and fourth adjacent symbols within the symbol group; and
wherein said user equipment is configured to transmit, over a physical random access channel, a signal comprising the symbol group with the scrambled symbols.

13. A method in a network node, the method comprising:
receiving a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group; and
descrambling predetermined symbols of the plurality of symbols forming the symbol group.

14. The method of claim 13, wherein the predetermined symbols are descrambled in a frequency domain, and wherein the method further comprises processing of phases of the descrambled symbols to determine a time of arrival (ToA) value.

15. The method of claim 14, comprising transmitting the determined ToA value to a user equipment from which the signal comprising the group of symbols was received.

16. A network node comprising:
a processor; and
a memory, said memory containing instructions executable by said processor, whereby said network node is configured to:
receive a signal over a physical random access channel, the signal comprising a plurality of symbols forming a symbol group, wherein a first scrambling symbol has been applied to at least first and second adjacent symbols within the symbol group, and a second scrambling symbol has been applied to at least third and fourth adjacent symbols within the symbol group; and
descramble predetermined symbols of the plurality of symbols forming the symbol group.

17. The network node of claim 16, wherein the network node is configured descramble the predetermined symbols in a frequency domain, and wherein the network node is further configured to process phases of the descrambled symbols to determine a time of arrival (ToA) value.

* * * * *